United States Patent Office 3,459,882
Patented Aug. 5, 1969

3,459,882
PAY BROADCAST RECEPTION APPARATUS WITH BATTERY POWERED DEBIT MEANS
Ralph Parton Gabriel, Woking, and Patrick Bass, London, England, assignors to R. & R. Research Limited
Filed July 26, 1965, Ser. No. 474,611
Claims priority, application Great Britain, Aug. 18, 1964, 33,766/64
Int. Cl. H04n 1/44
U.S. Cl. 178—5.1         15 Claims

ABSTRACT OF THE DISCLOSURE

The invention relates to apparatus for receiving pay-broadcast programme signals transmitted together with fee-demand signals. The apparatus comprises a battery-powered debit means operated by the fee-demand signals to establish a corresponding debit condition. The apparatus also includes A-C powered reproducing means responding to the programme signals to reproduce a programme. Payment or acceptance of the debit established by the debit means may be required before the reproducer becomes operative. For example, the programme signals may be scrambled and an unscrambling device may be made operative by accepting the debit. The battery which powers the debit means may be charged from the A-C mains.

---

This invention relates to pay-broadcast reception apparatus and in particular to pay-broadcast receivers or to attachment units for commercial receivers rendering them capable of being used in pay-broadcast systems. By the expression pay-broadcast system is meant a system in which programmes are made available to subscribers only against the payment of a fee which may be paid in advance or in arrears. Many pay-broadcast systems already proposed make use of some form of fee demand registration equipment at each subscriber's receiver, while the station at which the programmes are originated sends out fee demand signals which cause the registration of specific fee demands in those receivers which are about to receive or have already received a programme. Since the pay programmes transmitted may have various designated prices or values the fee demand signal will usually have a nature specific to the programme to which it relates. It may be that the reception of a fee demand signal will cause a demand which has immediately to be satisfied if reception is to continue, as in systems in which continued operation of the receiver after the receipt of a fee-demand signal requires that coins to not less than the appropriate value be inserted in a coin box. Alternatively, the reception of a fee-demand signal may cause the registration of a debit. Successively recorded debits will be summed and appropriate arrangements will be made for the periodic discharge of the accumulated debit.

It may occur to some subscribers that fraudulent avoidance of due charges may be possible by preventing reception of the fee demand signals, especially when, as in some proposed systems, only one fee-demand signal is sent in connection with each programme. For example, in co-pending U.S. Patent No. 3,249,689 there is described a pay-broadcast system in which a fee signal is transmitted only once during each pay programme, and that is at the end of the programme or very near the end of the programme. Accordingly, some subscribers may be tempted to accept a programme and then, just before the fee signal is due to be received, to attempt to prevent its reception or to disable the receiver in such a manner as to prevent the fee demand signal from becoming effective.

It is an object of the invention to provide a receiver responsive to fee demand signals with some measure of protection against attempts to avoid due payment or debit registration.

Figure 1:
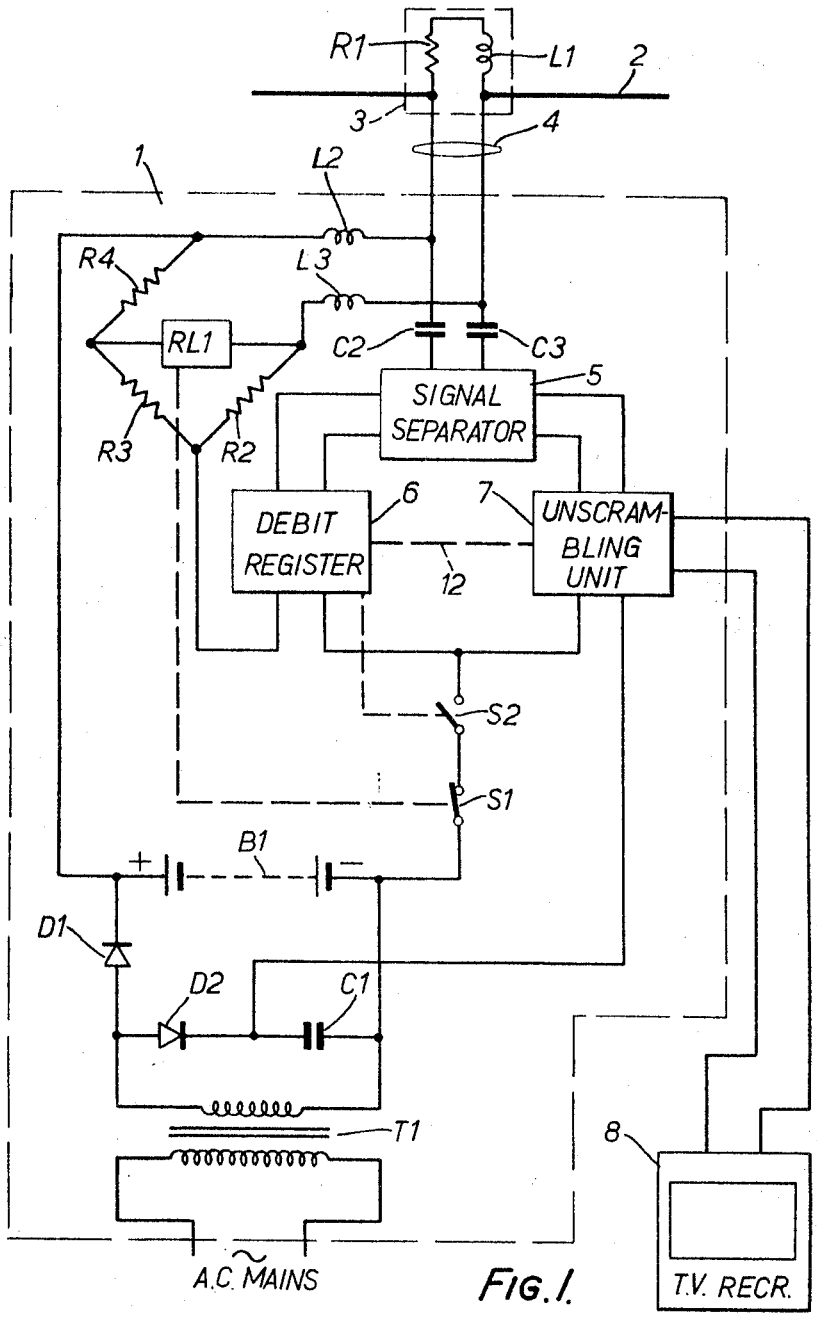
Figure 2:
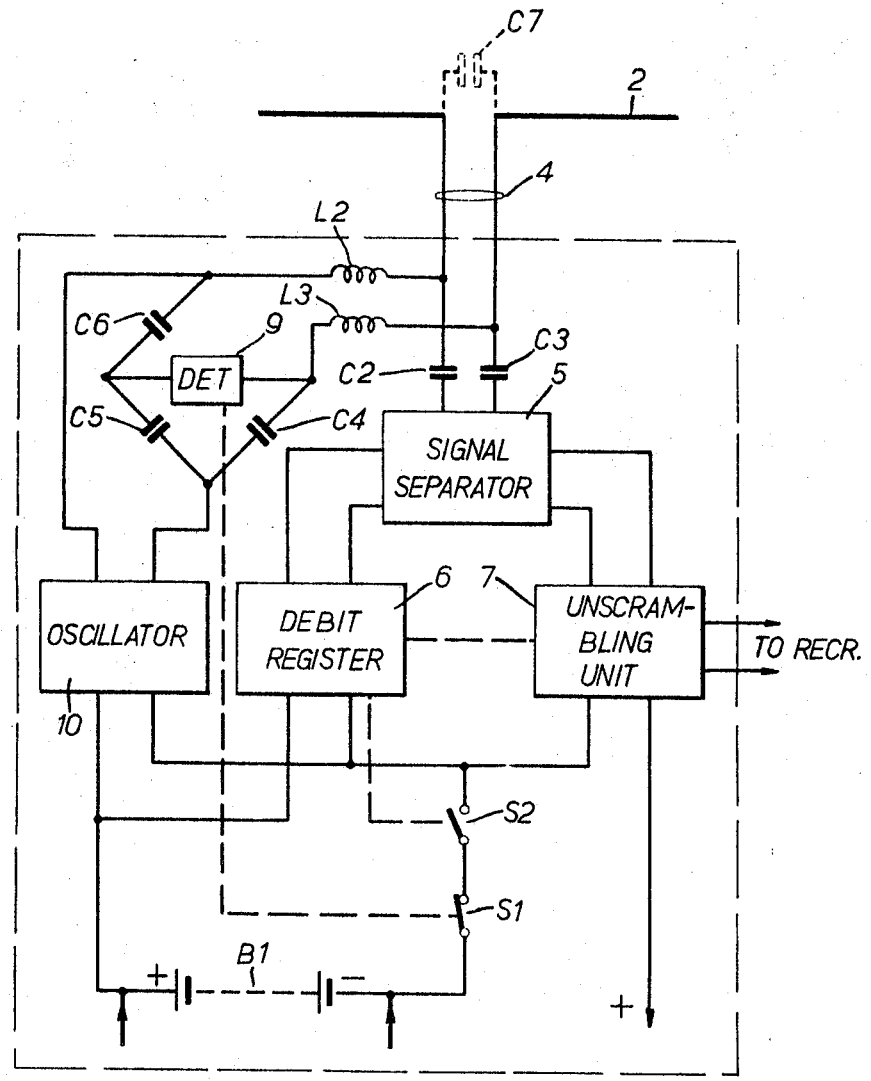

Further features and advantages of the invention will appear from the following description of embodiments thereof, given by way of example only, taken in conjunction with the accompaying drawings, comprising FIGURES 1 and 2, in which like elements are denoted by line reference characters and in which:

FIGURE 1 shows schematically one embodiment of a subscriber's reception equipment for a pay-television system, and FIGURE 2 shows schematically those parts of another embodiment of subscriber's reception equipment for a pay-television system which differs from the embodiment described in relation to FIGURE 1.

In both embodiments the equipment shown includes an input path for received programme signals and fee-demand signals, a televsion receiver to reproduce the programme signals and a control unit to debit the subscriber in accordance with the received fee-demand signals. Means are provided so that when the television receiver is operative the control unit is likewise operative.

A subscriber may decide, either by accident or by fraudulent intent, to turn off the alternating current mains supply to the apparatus or to disconnect or otherwise disable his input path before the reception of the fee demand signal, perhaps in respect of a programme of which he has already received all or a part. In the embodiment described in relation to FIGURE 1, disconnection of the alternating-current mains supply is ineffective to put the control unit out of action, because this unit is powered by a battery which is preferably but not essentially charged from the alternating current mains. There is also provided detector means so arranged that if the path by which incoming signals are fed to the control unit, which in the present embodiment includes a radio antenna, is electrically disturbed, no more programmes will be reproducible, at least until the unit is next serviced by the system operator.

In this case the detector arrangement comprises an electrical bridge circuit which is normally balanced when the equipment is operative but which becomes unbalanced if the subscriber should disconnect his antenna from the apparatus, or if he should short-circuit the lead connecting the antenna to the equipment, as for example by piercing it with a pin. One diagonal of the bridge is connected to a power supply and in the other diagonal is connected a switch which if the bridge becomes unbalanced opens a circuit to prevent further operation of the equipment until the switch has been re-set. Obviously this switch is arranged within a sealed enclosure so as to be incapable of being tampered with by fraudulently-inclined subscribers.

In FIGURE 1 a sealed casing denoted by broken line 1 encloses the control equipment. Radio signals received on an antenna 2 are fed through a feeder 4 to the control unit. The received signals will comprise pay programme signals and accompanying fee-demand signals. In the case of a broadcast system as here described the programme signals will be scrambled so that there are transmitted in a form useless to control a normal receiver, and the control unit includes an unscrambling device operable to convert the received scrambled signals in to normal signals capable of usefully operating the receiver. Signals reaching the control equipment by way of feeder 4 are passed into a signal separator unit 5 which directs the fee-demand signals into a debit-register 6 and the scrambled programme signals into a signal unscrambling unit 7. The debit-registering device responds to received fee-demand signals by establishing an appropriate debit. The device may include a coin-box by which the debit may be immediately repaid, or may include a register upon which successive debits are accumulated against a deferred payment. Debit register 6 is powered by a battery B1, which is conveniently charged from the alternating-current mains by means of a transformer T1 and a rectifier D1.

It is assumed that in this embodiment the received programme signals are not initially suitable for operating a television receiver. These signals are therefore applied by way of signal separator unit 5 to the unscrambling unit 7 which converts the received scrambled programme signals into normal television signals capable of operating a television receiver 8 to which they are applied. The programme signal may be scrambled by being transmitted with a non-standard carrier frequency, or by having non-standard synchronising signals, or by having the frequency components of the video signal inverted, or in any other convenient manner. Suitable arrangements for scrambling and unscrambling programme signals are disclosed in co-pending patent applications Nos. 444,296 filed Mar. 31, 1965, 447,398 filed Apr. 12, 1965 and U.S. Patent No. 3,313,880, but other scrambling and unscrambling systems may be employed as desired. If a wire distribution network is used to distribute the programme signals and fee-demand signals instead of the radio broadcast system for which the apparatus depicted by FIGURE 1 is intended, then unscrambling of the programme signals is not essential and unscrambling unit 7 may be replaced by an electrically operated switch, for example a relay, controlled in the same manner as unit 7.

The unscrambling unit 7, or the electrical switch which may replace it in a wire-distribution system, is conveniently powered by unidirectional current also derived from transformer T1 by way of a rectifier D2 and a smoothing capacitor C1. Thus it is made essential that transformer T1 be energised from the alternating current mains before programme signals may be received, and it is arranged that battery B1 shall be charged whenever programme signals are being received.

In order to receive a pay-television programme the subscriber operates a latching acceptance switch S2 which activates debit-register 6 and unscrambling unit 7 by completing the negative side of the power supply circuit for each. Unscrambler unit 7, which may be additionally controlled by debit-register 6 as indicated by broken line 12, is operable to provide normal television signals to a television receiver 8 for normal reproduction. The control indicated by broken line 12 may be arranged to permit unscrambling unit 7 to operate only when a fee-demand established by signals passed to control unit 6 has been met by the deposition of coins to the appropriate value in a coin box forming a part of the control unit, or when the registered total debit does not exceed a predetermined sum.

During or after the transmission of the pay programme, fee-demand signals transmitted from the programme originating station are received by control unit 1 and applied to a debit-registering device which may be a coin mechanism, or may be the subscriber's account state meter, that is, a device indicating a total debit incurred as a result of programmes accepted over a period. When a coin mechanism is incorporated in the debit-register either the unscrambling unit may be disabled until the appropriate payment has been made, or the receiver 8 itself may be disabled.

After the transmission of the fee-demand signals, the programme originating station transmits a latch-release signal which is applied to energise a solenoid (not shown) contained in debit-register 6, which causes latching acceptance switch S2 to return to the "off" position in which it is illustrated. Since the fee-demand signals and the latch release signal are received by the battery-powered-regiser 6, disconnection of the alternating-current supply will not permit avoidance of the fee demand, and an appropriate debit will be established whenever a pay programme has been received, even through the alternating current supply to the apparatus be disconnected before the receipt of the fee-demand signal appropriate to that programme.

The latching acceptance switch S2 is so constructed that, once operated to its "on" position it cannot be returned to its "off" position by the personal act of the subscriber, but only by the receipt of a latch-release signal.

A pay-television system in which the receiving apparatus includes signal-released latching switches such as S2, whereby it is necessary for fee-demand signals to be transmitted once only at or near the end of a programme, is fully described in British Patent No. 1,011,410.

As an additional precaution against fraudulent payment evasion, it may be arranged that the receiving equipment is rendered inoperative if a fee-demand signal is not received within a predetermined time after the actuating of the programme acceptance switch S2.

The arrangements described above may be used in the pay-broadcast system described in U.S. Patent 3,200,924. In that system a series of fee-demand pulses, the number of which depends upon the designated fee for the next programme is transmitted between programmes, or just before the commencement of each programme. An appropriate mechanism at each subscriber's position stores the fee-demand information until such time as the subscriber decides to accept the programme or until a fee-demand for a succeeding programme is established. If the subscriber does not accept the programme the fee demand is cancelled by a re-setting signal transmitted prior to the transmission of the succeeding fee-demand signal. The use of a battery-powered debit-register in such a system will ensure that the mechanism or unit used is activated in the intervals between programmes and, as will be described below, may be used to activate a detector circuit by which evasion of payment by interference with the feeder by which signals are applied to the control equipment.

In the embodiment of the invention described in relation to FIGURE 1 the detector means consists of a Wheatstone bridge network formed by four resistors R1, R2, R3 and R4, together with a relay RL1 having normally-made contacts S1, which are included in the common negative lead from debit-register 6 and unscrambling unit 7 to the power supply by way of switch S2. Relay RL1 is connected in one diagonal of the bridge, while the other bridge diagonal is connected in the positive lead from battery B1 to debit-register 6, so that the current drawn from the battery by the control unit flows through the two parallel paths R1–R2 and R3–R4. The values of the four resistors are chosen so that the bridge network is normally balanced, so that no appreciable current flows through relay RL1. It will be seen that resistor R1 of the bridge network is positioned at the antenna 2, being connected between the two elements of the antenna in series with a radio-frequency choke L1, these components being included within a casing 3. Choke L1 is provided to prevent the presence of resistor R4 affecting the performance of antenna 2. Two further radio-frequency chokes L2, L3 are placed in the leads by which the bridge network is connected to feeder 4, while isolating capacitors C2, C3 prevent direct current entering the signal separator unit 5.

If it is attempted to avoid payment for a programme by disconnecting the antenna from the equipment for the period during which the fee-demand signals are transmitted, then resistor R4 will be removed from the bridge network, which will then be unbalanced so that relay RL1 will operate and contact S1 will remove the power supply from unscrambling unit 7. The pay-television equipment will therefore be put out of action, since the power supplies to both control unit 6 and unscrambling unit 7 are interrupted and relay RL1 is preferably chosen of a type which, once operated, can be restored to its unoperated position only by manual adjustment. Needless to say, the relay will be enclosed within a tamper-proof enclosure accessible only to authorized persons. Re-connecting the antenna to the equipment will not restore the supply, and before any further programmes can be received the subscriber will have to call for service, in which case the relay RL1 may be re-set by a representative of the pay-television station, after investigation of the circumstances.

The bridge network will also become unbalanced if the lead from the antenna to the equipment is short-circuited, as by piercing the antenna cable 4 by a pin, or by some other means, and the result will again be the disablement of the equipment.

There is of course a risk of the subscriber envisaging some more subtle way of preventing the reception of fee-demand signals. He might, for example, try to screen the antenna at appropriate times to prevent the reception of these signals. This risk may be reduced by installing the antenna outside the subscriber's residence, while for densely populated regions a community antenna will usually be employed.

Alternatively the system described below in relation to FIGURE 2 of the drawings may be employed. Here the detector means responsive to tampering with the antenna and its connections comprises a bridge network formed by capacitors C4, C5, C6 and C7, of which the latter is the intrinsic self-capacitance of antenna 2. In this case the power supply to the bridge is provided by an oscillator 9, fed with power from battery B1 whenever switch S2 is closed, while the bridge-balance detector 10 is constituted by a suitable oscillation-sensitive device, of which many are well known in the art. In this case detector 10 will respond if any substantial change in the capacitance of antenna 2 occurs, such as would be induced by any attempt at screening. A suitable frequency for the bridge oscillator would be well below the normal broadcast bands and below the resonant frequency of the antenna, for example, in the range of 20 to 50 kc./s.

It will be apparent to those skilled in the art that both simpler and more complex detector means operating upon the basic principles of those described above may be devised, thus it would be possible, in cases where disconnection of the feeder cable is mechanically rendered impossible without detection, for the power supply to the unscrambling unit to be taken by way of a fuse which would blow if a short-circuit were applied to the antenna or to the feeder cable.

The use of a battery-fed pay-television unit would also enable a system such as that disclosed in British Patent No. 1,011,410 to be operated over a wire broadcast network such as a coaxial cable network, with carrier-borne signals. Moreover the use of the invention is not restricted to systems of this kind. It may be applied to any pay-broadcast system which relies for its operation on the reception of control signal by the subscriber's apparatus without interference.

The detector means provided may be regarded as means for providing additional security for any pay-television system, whether operated with broadcast radio signals or over wire, and whether battery-powered pay-television units are used or not. It will be appreciated that where the pay-broadcast signals are provided to the subscriber by wire, resistor R1 and inductor L1 would be connected across the subscriber's capacitance-isolated feeder cable, instead of across the antenna as shown in the drawings, the protection provided being similar.

It may be convenient to house any or all of the elements of the pay-television equipment, the battery, the unscrambler or its equivalent, or the detector means, in a single enclosure which may also incorporate a coin-box. This attachment can then form an auxiliary to allow the pay programme operating station to control the reproduction of pay programmes on a subscriber's conventional receiver which may also be used to obtain free programmes broadcast in the normal manner.

Such an attachment is preferably connected in an input path or antenna lead to a conventional receiver, which need not be altered in any way nor have internal connections made to it. Thus the pay broadcast authority need not supply additional receivers to subscribers already possessing conventional receivers and need supply only conventional receivers to those not already possessing one.

As has already been noted, when the transmissions are not scrambled, no unscrambler unit is used and some power-operated device such as an electromechanical relay should replace the unscrambling unit to ensure that while reproducing a pay broadcast the subscriber cannot disconnect the alternating current supply to the control unit, and so perhaps prevent his battery from being sufficiently charged to operate the control unit when the fee-demand signal is transmitted.

It should be noted that although the invention is described above in its application to a television broadcast system, it may equally well be employed in a system for the distribution of audio programmes, and in either case, the audio signals may be scrambled as well as or in replacement for the television programme.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

We claim:

1. Pay-broadcast reception apparatus comprising, in combination: a source of programme signals accompanied by fee-demand signals; battery-powered debit means operable by said fee-demand signals to establish a corresponding debit condition; alternating-current powered reproducing means operable by said programme signals to reproduce a programme; means applying said fee-demand signals from said source to said debit means; and means applying said programme signals from said source to said reproducing means.

2. Pay-broadcast reception apparatus comprising, in combination: a source of programme signals accompanied by fee-demand signals; battery-powered debit means operable by said fee-demand signals to establish a corresponding debit condition; a battery; circuit means connecting said battery to power said debit means; means applying said fee-demand signals from said source to said debit means; alternating-current powered reproducing means operable by said programme signals to reproduce a programme; means applying programme signals from said source to said reproducing means; alternating-current powered battery-charging means; circuit means connecting said battery to be charged from said charger means; alternating-current supply means; and circuit means connecting said reproducing means and said charging means to said supply means.

3. Pay-broadcast reception apparatus comprising, in combination: a source of scrambled programme signals accompanied by fee-demand signals; battery-powered debit means operable by said fee-demand signals to establish a corresponding debit condition; a battery; circuit means connecting said battery to power said debit means; means applying fee-demand signals from said source to said debit means; direct-current powered signal unscrambling means operable to develop normal programme signals from scrambled programme signals; programme reproducing means operable by applied normal programme signals to reproduce a programme; means applying scrambled programme signals from said source to said signal unscrambling means; means applying signals from said unscrambling means to said reproducing means; alternating-current powered power supply means including battery-charging means and direct-current supply means; circuit means connecting said battery-charging means to charge said battery; and circuit means connecting said direct-current supply means to power said signal unscrambling means.

4. Pay-broadcast reception apparatus according to claim 3 in which said circuit means connecting said direct-current supply means to said signal unscrambling means includes a switch, said switch forming also a part of said circuit means connecting said battery-charging means to charge said battery.

5. Pay-broadcast reception apparatus comprising in combination: a source of scrambled programme signals accompanied by fee-demand signals; programme reproducing means operable by normal programme signals; signal unscrambling means operable to convert said scrambled programme signals into normal programme signals; battery-powered debit means operable by said fee-demand signals to establish a corresponding debit condition; signal separating means operating to separate said scrambled programme signals and said fee-demand signals; circuit means applying said fee-demand signals from said signal separating means to said debit means; circuit means applying said scrambled programme signals from said signal separating means to said signal unscrambling means; circuit means applying said normal programme signals from said signal unscrambling means to said programme reproducing means; feeder means connecting signals from said source to said signal separating means; and detector means responsive to interference with said feeder means to prevent operation of said signal unscrambling means.

6. Pay-broadcast reception apparatus according to claim 5 in which said signal source is a radio antenna.

7. Pay-broadcast reception apparatus according to claim 5 in which said signal source is a wire signal-distribution network.

8. Pay-broadcast reception apparatus according to claim 5 in which said detector means includes a balanced bridge circuit formed by four impedance elements, one of said impedance elements including said feeder means; a power supply connected to one diagonal of said bridge circuit and current-responsive means connected to the other diagonal of said bridge circuit, said current responsive means operating in response to unbalance of said bridge circuit to prevent operation of said signal unscrambling means.

9. Pay-broadcast reception apparatus comprising, in comprising, in combination: a dipole radio antenna; the series combination of a first resistor and an inductor connected across the elements of said dipole; signal separator means deriving fee-demand signals and programme signals from applied radio frequency signals modulated with said fee-demand and programme signals; feeder means connecting said antenna to said signal separator means for radio-frequency currents; a resistance bridge including second, third and fourth resistors in respective arms thereof; circuit means connecting said first resistor for direct current in a first arm of said bridge by way of said feeder; an out-of-balance detector connected in a diagonal of said bridge, said detector responding to an unbalanced current condition in said bridge by interrupting a controlled electrical circuit; direct-current powered debit means operable by fee-demand signals to establish a corresponding debit condition; circuit means connecting said fee-demand signals from said separator means to said debit means; a source of direct current, said source being connected to power said debit means by way of another diagonal of said bridge and by way of said controlled electrical circuit; alternating-current powered programme reproducer means operable by programme signals to reproduce a programme; signal control means; circuit means applying programme signals from said separator means to said reproducer means by way of said control means; and a power source for said control means, said power source being connected to said control means by way of said controlled electrical circuit.

10. Pay-broadcast reception apparatus in accordance with claim 9 in which said source of direct current is a battery.

11. Pay-broadcast reception apparatus in accordance with claim 9 in which said out-of-balance detector is an electrical relay having a normally-closed contact connected in series in said controlled electrical circuit.

12. Pay broadcast reception apparatus in accordance with claim 9 in which said controlled electrical circuit includes also an electrical switch, said switch being personally operable to close said circuit and having electrically operable release means whereby said switch is released in response to an applied electrical unlatching signal to break said circuit; unlatching means in said debit means, said unlatching means being operable by applied fee-demand signals to develop an electrical unlatching signal; and circuit means applying unlatching signals from said debit means to said switch.

13. Pay-broadcast reception apparatus comprising, in combination: a dipole radio antenna having an intrinsic capacitance; signal separator means deriving fee-demand signals and programme signals from applied radio-frequency signals modulated with said fee-demand and programme signals; feeder means connecting said antenna to said signal separator means for radio-frequency currents; a capacitance bridge including first, second and third capacitors in respective arms thereof, circuit means connecting said intrinsic capacitance of said antenna in a fourth arm of said bridge for hgh-frequency current; a direct-current powered source of high-frequency current; circuit means connecting said source to a diagonal of said bridge; an out-of-balance detector connected in the other diagonal of said bridge, said out-of-balance detector operating in response to an unbalanced current condition in said bridge to interrupt a controlled electrical circuit; a source of direct current; direct-current powered debit means responsive to fee-demand signals to establish a corresponding debit condition; a personally-operable switch; circuit means connecting said direct-current source to power said debit means and said high-frequency current source by way of said switch and by way of said controlled electrical circuit; direct-current powered signal control means; programme reproducer means operable by applied programme signals to reproduce a programme; circuit means applying programme signals from said separator means to said reproducer means by way of said control means; a further source of direct current; and circuit means including said switch applying current from said further source to power said control means thereby to allow signals to pass to said reproducer means.

14. Pay-broadcast reception apparatus in accordance with claim 13 in which first said source of direct current is a battery.

15. Pay-broadcast reception apparatus in accordance with claim 13 in which first said source of direct current is a battery and said further source of direct current is an alternating-current fed power unit developing direct current and developing also battery charging current; together with circuit means applying current from said charging means to charge said battery and circuit means applying said direct current to power said control means.

References Cited

UNITED STATES PATENTS

| | | | |
|---|---|---|---|
| 3,119,558 | 1/1964 | Kinross | 178—5.1 |
| 3,249,689 | 5/1966 | Davis | 178—5.1 |

ROBERT L. GRIFFIN, Primary Examiner

HOWARD W. BRITTON, Assistant Examiner

U.S. Cl. X.R.

178—6